(12) United States Patent
Sivakumar et al.

(10) Patent No.: US 7,388,829 B2
(45) Date of Patent: Jun. 17, 2008

(54) METHOD AND APPARATUS FOR DETECTING AND RECOVERING FROM FAULTS ASSOCIATED WITH TRANSPORT PROTOCOL CONNECTIONS ACROSS NETWORK ADDRESS TRANSLATORS

(75) Inventors: Senthil Sivakumar, Cupertino, CA (US); Anantha Ramaiah, Sunnyvale, CA (US); Kaushik Biswas, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 547 days.

(21) Appl. No.: 11/089,721

(22) Filed: Mar. 25, 2005

(65) Prior Publication Data

US 2006/0215654 A1 Sep. 28, 2006

(51) Int. Cl.
*H04L 12/56* (2006.01)
(52) U.S. Cl. ............... 370/218; 370/465; 709/227; 709/239
(58) Field of Classification Search ............... 370/466, 370/227, 465; 709/227, 239
See application file for complete search history.

(56) References Cited

U.S. PATENT DOCUMENTS

2004/0052257 A1* 3/2004 Abdo et al. ............... 370/392
2006/0062203 A1* 3/2006 Satapati ............... 370/352
2006/0164974 A1* 7/2006 Ramalho et al. ............ 370/219

OTHER PUBLICATIONS

Ong, L. et al., "An Introduction to the Stream Control Transmission Protocol (SCTP)," Network Working Group, RFC 3286, May 2002, 9 pages.
Stone, J., et al., "Stream Control Transmission Protocol (SCTP) Checksum Change," RFC 3309, Sep. 2002, 16 pages.
Stewart, R. et al., "Stream Control Transmission Protocol (SCTP) Partial Reliability Extension," Network Working Group, RFC 3758, May 2004, 20 pages.
Stewart, R. et al., "Stream Control Transmission Protocol," Network Working Group, RFC 2960, Oct. 2000, 120 pages.

* cited by examiner

*Primary Examiner*—Seema S. Rao
*Assistant Examiner*—Sai-Ming Chan
(74) *Attorney, Agent, or Firm*—Hickman Palermo Truong & Becker LLP (57) ABSTRACT

Approaches to recover from faults associated with multi-homed clients having transport protocol connections that pass through network address translators are disclosed. In one approach, context information for a connection, between a first host and a second host, referencing one of several multi-homed network addresses of the first host, is automatically re-used when the second host switches to a different address of the first host, for example, when the first host becomes unavailable at the original address. Embodiments support seamless switchover of SCTP connections over NAT devices.

25 Claims, 6 Drawing Sheets

METHOD AND APPARATUS FOR DETECTING AND RECOVERING FROM FAULTS ASSOCIATED WITH TRANSPORT PROTOCOL CONNECTIONS ACROSS NETWORK ADDRESS TRANSLATORS

FIELD OF THE INVENTION

The present invention generally relates to network data communication transport protocols that support multi-homed endpoints, such as Stream Control Transmission Protocol (SCTP). The invention relates more specifically to methods of managing transport protocol connections across network address translator (NAT) devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Stream Control Transmission Protocol (SCTP) is a transport-layer data communication and control protocol that facilitates communication between networked computer devices. SCTP is described, for example, in R. Stewart et al., "Stream Control Transmission Protocol (SCTP): A Reference Guide" (Boston: Addison-Wesley, 2001).

A network element is termed "multi-homed" when the network element is identified by more than one network address. For example, home gateways and other network elements may comprise more than one network interface card (NIC), each of which has a separate Internet Protocol (IP) address. SCTP can support communications between a multi-homed network element and another network element, such as a server. In particular, under SCTP a multi-homed network element can initiate a transport layer connection by advertising more than one network address in a connection initiation message.

Network address translator (NAT) devices enable concealing the private network addresses of hosts on a local network from hosts outside the local network. NAT devices typically inspect all packets moving between the local network and external devices or internetworks, and transform host network addresses in the packet to reference the NAT device.

Multi-homed network elements may experience a failure of one or more interfaces. When such a failure occurs, the network element becomes unreachable at the network address that is associated with the failed interface. A server or other application that knows that a client device is multi-homed may respond to such a failure by switching over to a different network address associated with the same client, and sending messages to that address. Alternatively, the client may dynamically change its network address after a connection or session is established.

However, applications that use SCTP with multi-homing cannot operate across NAT devices seamlessly when an SCTP association attempts to change to a different one of the multi-homed network addresses. This drawback arises because conventional NAT devices are configured to store connection state or session information, such as segment sequence numbers and acknowledgment numbers, as part of a single connection state object, which uniquely identifies the connection using only one host network address. Classically, a connection object is identified by a five-tuple of values comprising protocol identifier, source network address, source port value, destination network address, and destination port value. There is no mechanism for substituting different network addresses of multi-homed devices once a connection is established.

Based on the foregoing, there is a clear need for an improved NAT device that can properly process messages or packets when endpoints in a multi-homed connection switch over to a different network address or connection association.

There is a specific need for an approach in a NAT for seamlessly processing packets or otherwise responding to such a switchover among endpoints in a multi-homed SCTP association that occurs after the SCTP association is established.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for detecting and recovering from faults associated with transport protocol connections across network address translators is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Structural and Functional Overview
    2.1 Network Context
    2.2 Responding to Host Address Change When NAT Can Allocate Multiple Public Addresses
    2.3 Responding to Host Address Change When NAT Can Allocate Single Public Address
  3.0 Implementation Mechanisms—Hardware Overview
  4.0 Extensions and Alternatives

1.0 General Overview

The needs identified in the foregoing Background, and other needs and objects that will become apparent for the following description, are achieved in the present invention, which comprises, in one aspect, a method comprising the computer-implemented steps of receiving a first message of a transport protocol, wherein the first message includes two or more private network addresses of a first host; creating and storing a first mapping of a first private network address to a first public network address, a second mapping of a second private network address to a second public network address; linking the first mapping to the second mapping; in response to receiving a second message from the first host, creating and storing context information for a first transport session between the first host and a second host referencing the first private network address, and linking the context information to the first mapping and the second mapping; receiving a third message of the transport protocol from the second host that specifies the second public network address; and based on the mappings, automatically using the context information for processing subsequent messages between the first host and the second host that use the second public network address and the second private network address.

In another aspect, the invention provides a method for detecting and recovering from faults associated with transport protocol connections across network address translators, the method comprising the computer-implemented steps of receiving a connection initialization message of a transport protocol, wherein the connection initialization message includes two or more private network addresses of a first host; allocating two or more public network addresses corresponding to the two or more private network addresses; electronically creating and storing a first mapping of a first private network address to a first public network address, a second mapping of a second private network address to a second public network address, and a link of the first mapping to the second mapping; in response to receiving a second message of the transport protocol from the first host, creating and storing context information comprising one or more session parameters for a first transport session between the first host and a second host referencing the first private network address, and creating a second link of the context information to the first mapping and the second mapping; receiving a third message of the transport protocol from the second host that specifies the second public network address as a destination; and based on the mappings and the links, automatically using the session parameters of the context information for processing subsequent messages between the first host and the second host that use the second public network address and the second private network address.

According to one feature, the transport protocol is Stream Control Transmission Protocol (SCTP). In another feature, the public network addresses are allocated from an available address pool of a network address translator (NAT). In yet another feature, the first host is a multi-homed device and the second host is a server.

According to one feature, the first mapping and the second mapping each comprise entries in a table, and each entry includes a protocol identifier, a private IP address value, a private port value, a public IP address value, a public port value, a destination IP address value, and a destination port value. In still another feature, the transport protocol is Stream Control Transmission Protocol (SCTP), and the context information comprises a transmission sequence number (TSN) and a selective acknowledgement (SACK) chunk.

In another feature, the first private network address and the second private network address are local area network Internet Protocol (IP) addresses that are not routable in the Internet, and the first public network address and the second public network address are public IP addresses that are routable in the Internet.

In yet another feature, the third message is a server response, the third message includes the second public network address as a destination address, and the server generates the third message in response to determining that the first host is unavailable at the first public network address.

In another aspect, the invention provides a method of detecting and recovering from faults associated with transport protocol connections across network address translators, the method comprising the computer-implemented steps of receiving a connection initialization message of a transport protocol, wherein the connection initialization message specifies two or more private network addresses of a first host; allocating a single public network address corresponding to the two or more private network addresses, and creating and storing a mapping of the two or more private network addresses to the public network address; modifying the connection initialization message to include the single public network address and forwarding the modified connection initialization message to the second host; determining that the first host is unavailable at a first private network address among the two or more private network addresses; and in response to receiving each subsequent message of the transport protocol from the second host that specifies the public network address as a destination, automatically modifying each subsequent message to specify a second private network address selected from among the two or more private network addresses; wherein a network address translator (NAT) apparatus performs all the preceding steps.

According to one feature, the NAT apparatus uses session parameters of a context associated with the first private network address for processing the subsequent messages between the first host and the second host that use the second private network address. According to another feature, the transport protocol is Stream Control Transmission Protocol (SCTP).

In yet another feature, the first host is a multi-homed device and the second host is a server. In still another feature, the mapping comprises a protocol identifier, a private IP address value, a private port value, a public IP address value, a public port value, a destination IP address value, and a destination port value.

In one feature the transport protocol may be Stream Control Transmission Protocol (SCTP), and the context information may comprise a transmission sequence number (TSN) and a selective acknowledgement (SACK) chunk.

According to one feature, the two or more private network addresses are local area network Internet Protocol (IP) addresses that are not routable in the Internet, and the single public network address is a public IP addresses that is routable in the Internet.

In yet another feature, the NAT apparatus determines that the first host is unavailable by periodically sending a probe message to the first host and determining whether the first host replies within a specified time. In a related feature, the probe message is an ICMP ping packet.

In other aspects, the invention encompasses a computer apparatus and a computer-readable medium configured to carry out the foregoing steps.

2.0 Structural and Functional Overview

2.1 Network Context

Figure 1:
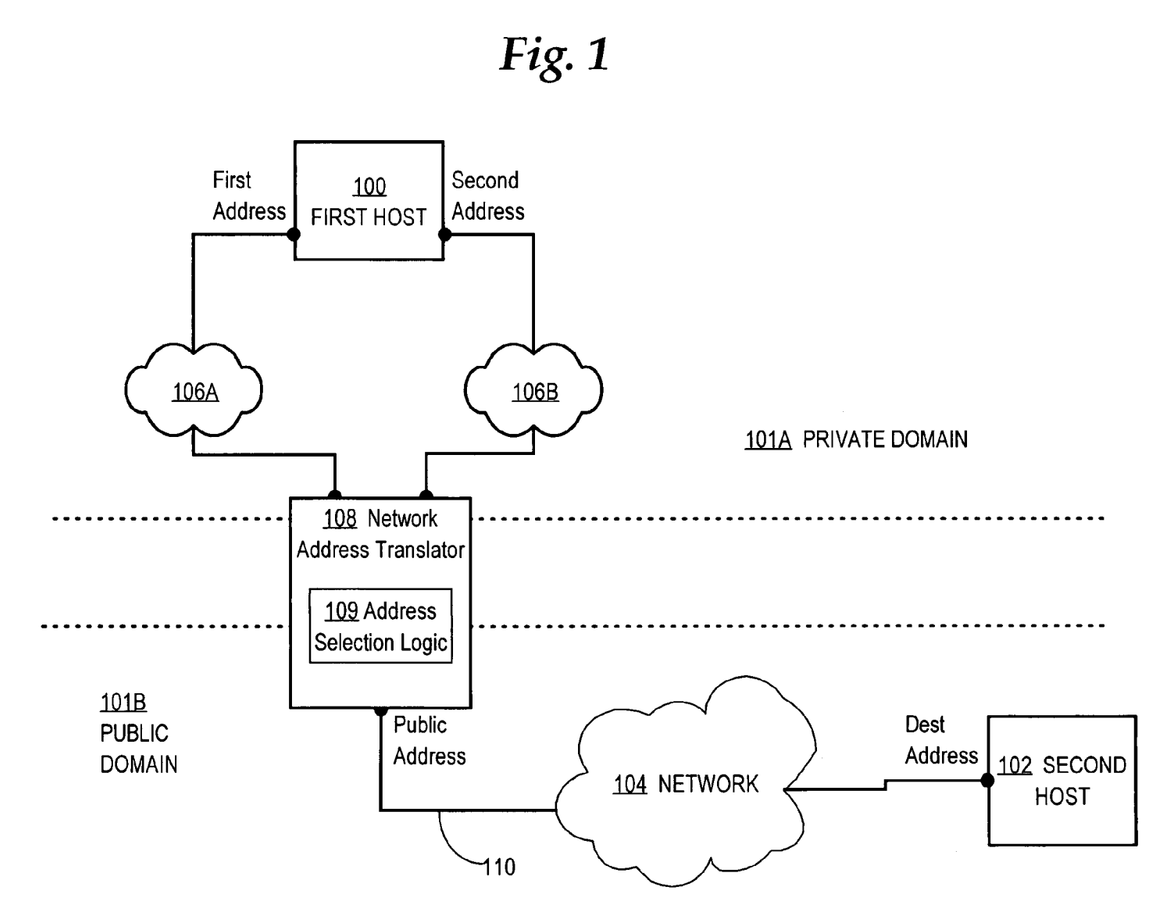
FIG. 1 is a block diagram that illustrates a hypothetical network in which an embodiment may be used.

FIG. 1 is a block diagram that illustrates a hypothetical network in which an embodiment may be used. A first host 100, which is multi-homed with a first address and a second address, is communicatively coupled through a first local network 106A and a second local network 106B to a network address translator (NAT) 108. The NAT provides a separate interface for each interface and address of the first host 100. The first host 100, first local network 106A and second local network 106B are located within a private domain 101A. True addresses of devices within the private domain 101A are considered private and the NAT 108 functions to prevent devices outside the private domain 101A from determining or directing traffic to the private addresses.

NAT 108 comprises address selection logic 109, which implements the functions described herein for detecting and recovering from faults associated with transport protocol connections. Address selection logic 109 comprises, for example, one or more computer programs, sequences of instructions, objects or other software elements that implement the functions described herein.

NAT 108 exposes a public address to devices that are within a public domain 101B. A link 110 links an interface of NAT 108 having a publicly routable network address to one or more networks 104. Each network 104 may comprise a LAN, WAN, internetwork, etc. A second host 102 is coupled to network 104. In one embodiment, second host 102 is a server that holds resources, and first host 100 is a client that requests or receives the resources.

Figure 2A:
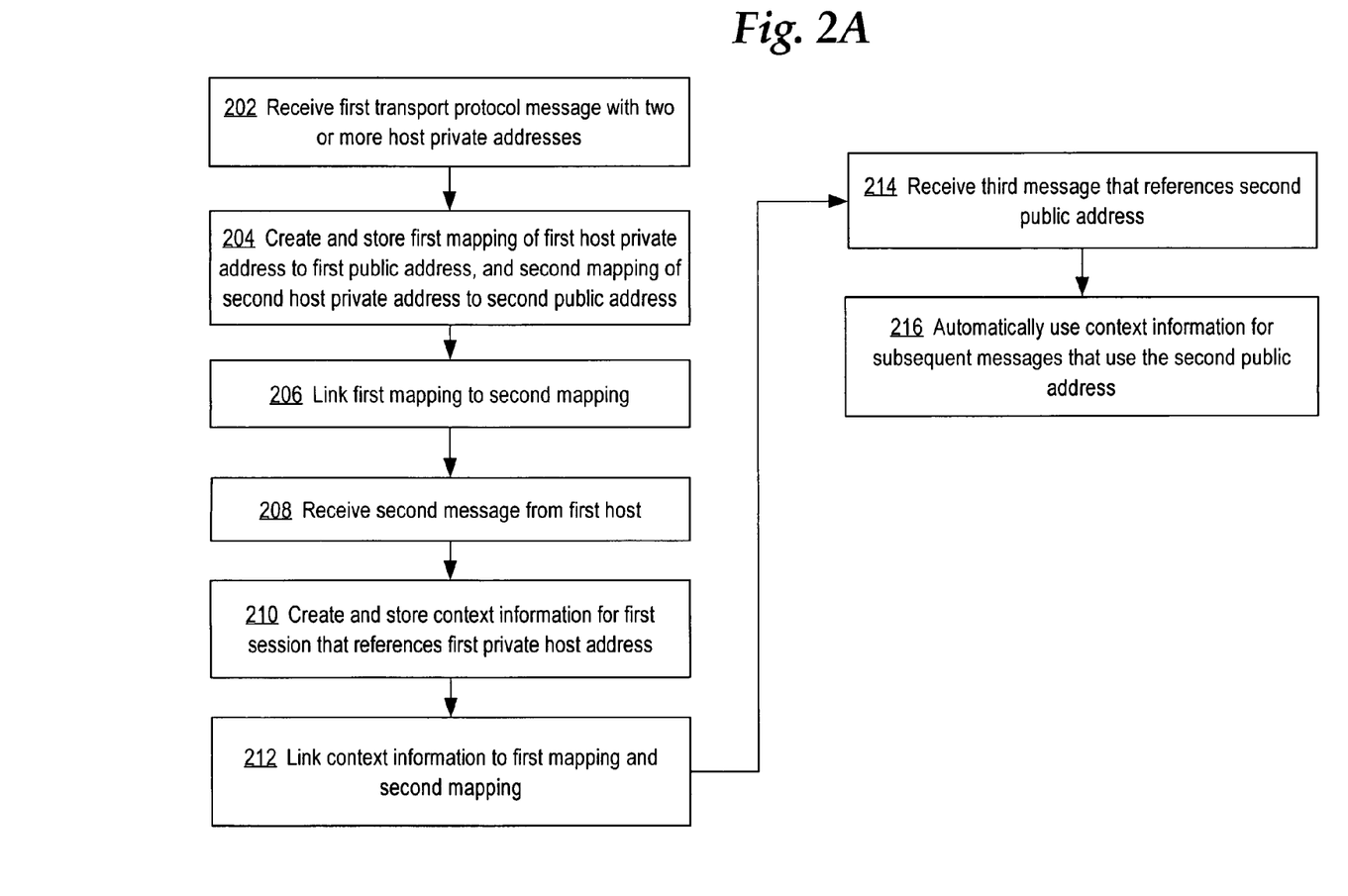
FIG. 2A is a flow diagram that illustrates a high level overview of one embodiment of a method for detecting and recovering from faults associated with transport protocol connections across network address translators.
Figure 2B:
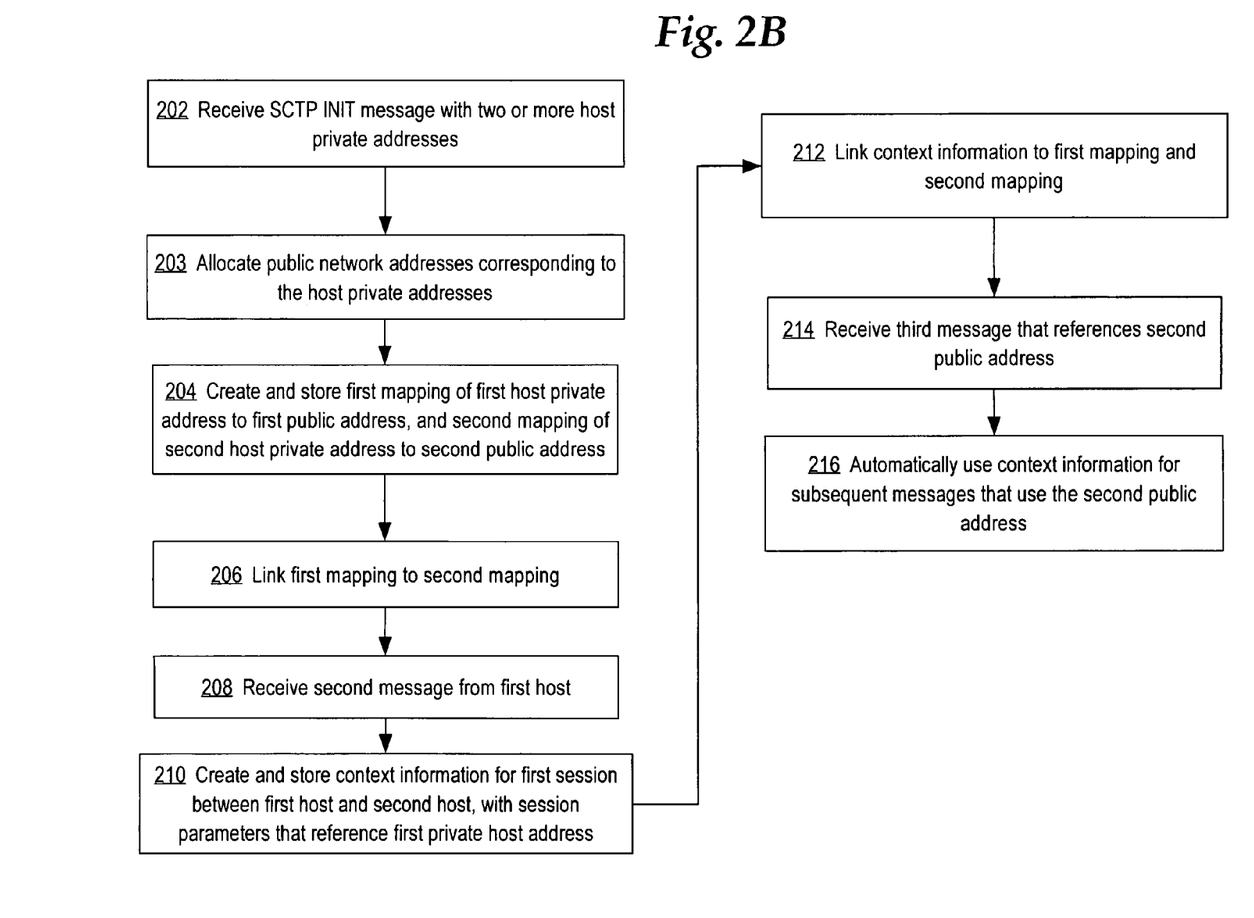
FIG. 2B is a flow diagram that illustrates another embodiment of a method for detecting and recovering from faults associated with transport protocol connections across network address translators.

2.2 Responding to Host Address Change When NAT Can Allocate Multiple Public Addresses FIG. 2A is a flow diagram that illustrates a high level overview of one embodiment of a method for detecting and recovering from faults associated with transport protocol connections across network address translators; FIG. 2B is a flow diagram that illustrates another embodiment of a method for detecting and recovering from faults associated with transport protocol connections across network address translators; and FIG. 3 is a block diagram of a NAT mapping that may be used to support the solutions of FIG. 2A or FIG. 2B.

Referring first to FIG. 2A, at step 202, a first transport protocol message, bearing two or more host private addresses, is received. For example, first host 100 issues and NAT 108 receives a connection initialization message that provides two source IP addresses. For purposes of illustrating a specific example, assume that the two source IP addresses are "10.1.1.1" and "20.1.1.1". Also, the use of two addresses is described herein merely to illustrate one possible example; other embodiments may be used with multi-homed hosts that use or advertise any number of addresses. The first message received at step 202 may additionally specify a protocol, a private port value, a destination address value, and a destination port value.

At step 204, a first mapping and a second mapping are created and stored. The first mapping maps a first one of the host private addresses to a first public address, and the second mapping maps a second one of the host private addresses to a second public address.

Figure 3:
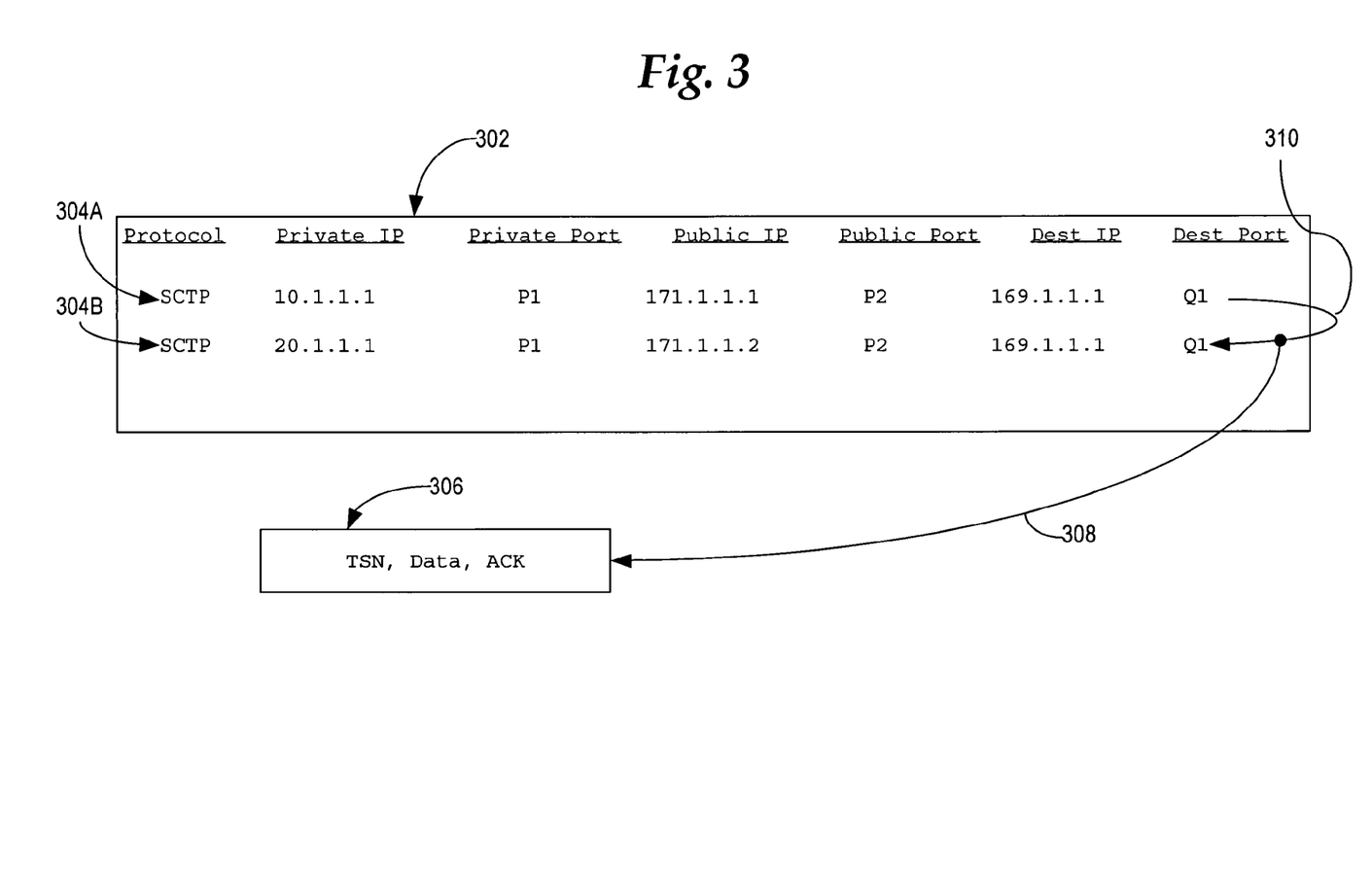
FIG. 3 is a block diagram of a NAT mapping that may be used to support the solution of FIG. 2A.

FIG. 3 presents an example mapping comprising a table 302 having entries 304A, 304B. Each entry 304A, 304B comprises values for protocol, private IP address, private port, public IP address, public port, destination IP address, and destination port. Entry 304A maps private IP address 10.1.1.1 to public IP address 171.1.1.1 and maps a second private IP address of the same host to a second public IP address 171.1.1.2. Thus, the embodiments of FIGS. 2A, 2B, 3 are applicable when NAT 208 has a pool of available public IP addresses that is sufficiently large to enable the NAT to make a 1:1 association of private IP addresses to public IP addresses. If the NAT runs out of available public IP addresses, then the solution of FIG. 4 may be used. The symbols P1, P2, Q1 denote port values and would be replaced with actual port values in an embodiment.

Each row of table 302 corresponds to one IP address associated with a multi-homed host. If a particular multi-homed host advertised three IP addresses, then table 302 would have three rows.

At step 206, the first mapping is linked to the second mapping. As shown in FIG. 3, a link 310 connects entry 304A to entry 304B. Pointers in table 302 may implement links among entries.

At step 208, a second message from the first host is received. For example, first host 100 sends a message indicating completion of negotiating a session or connection with second host 102, or sends a request for a resource directed to second host 102. In response, at step 210, context information for a first session that references the first private host address is created and stored. As seen in FIG. 3, step 210 may comprise instantiating a context object 306 that includes information such as a transport sequence number, acknowledgement number, or other data or metadata. The context information comprises basic metadata that defines a session or connection among hosts. In certain embodiments, the context object 306 may also store a five-tuple of values such as protocol, source and destination IP addresses, and source and destination ports. In an SCTP embodiment, step 208 can involve communicating any packets of a current connection association after a connection association is established.

At step 212, the context information is linked to both the first mapping and the second mapping. For example, in FIG. 3, link 308 associates both entries 304A, 304B with context object 306. Link 308 may comprise one or more pointers in table 302.

At step 214, a third message is received that references the second public address associated with the first host. For example, after receiving one or more messages from second host 102 that specify 171.1.1.1 as the destination address, NAT 108 receives a message from the second host 102 that specifies 171.1.1.2 as the destination address.

The sudden use of a different address may occur, for example, when the second host 102 determines, through a keep-alive mechanism, probe, or timeout that the first host 100 has stopped replying to messages that are directed to its first address. Such a condition could occur, for example, if the NIC associated with the first address has failed. In response, for example, a server might try to contact a second IP address for the host as part of the same session; the server does so because the server has become aware through the connection establishment phase that the server is communicating with a multi-homed host. In a conventional approach not used herein, a NAT would treat the received message as part of a separate session, and hence that previous session data would not be used. The first host would receive packets containing the wrong sequence numbers or acknowledgement numbers (e.g., TSN and SACK or Cumulative ACK values in an SCTP connection), and the connection eventually would be torn down.

At step 216, the previously stored context information is automatically used for subsequent messages that use the second public address. Thus, based on the second public address, and on links 310, 308, the NAT 108 automatically determines that the entries 304A, 304B are related and that context object 306 is associated with one of the linked entries. NAT 108 then immediately starts using the data in context object 306 for communications among first host 100 and second host 102, referencing the second public address.

In contrast, in prior practice, NAT 108 would not have had any stored context information referencing the second public address, and therefore the NAT would have failed to properly process the third message. Also, the hosts would have had to negotiate a new session or connection. With the techniques herein, communications that suddenly advertise a different address of a multi-homed host may proceed through the NAT without interruption. In a particular embodiment, when a NAT parses an SCTP INIT chunk and identifies multiple IP addresses, the NAT associates the addresses and can later intelligently identify that any packet destined to or originated from any such addresses belongs to the same session. Further, the NAT applies the context information, such as sequence number and acknowledgment number, and other session data that is associated with the addresses.

FIG. 2B presents steps similar to those of FIG. 2A. However, as indicated in step 202 of FIG. 2B, an embodiment may receive a SCTP INIT chunk that communicates two or more host private addresses, directed toward a second host as part of initializing an SCTP connection association. Thus, one embodiment is practiced particularly in the context of SCTP, which supports multi-homing. Further, at step 203, public network addresses are allocated corresponding to the host private network addresses, in response to or as part of parsing the SCTP INIT chunks. Step 203 clarifies that the process may explicitly involve an address allocation step at the NAT.

Figure 4:
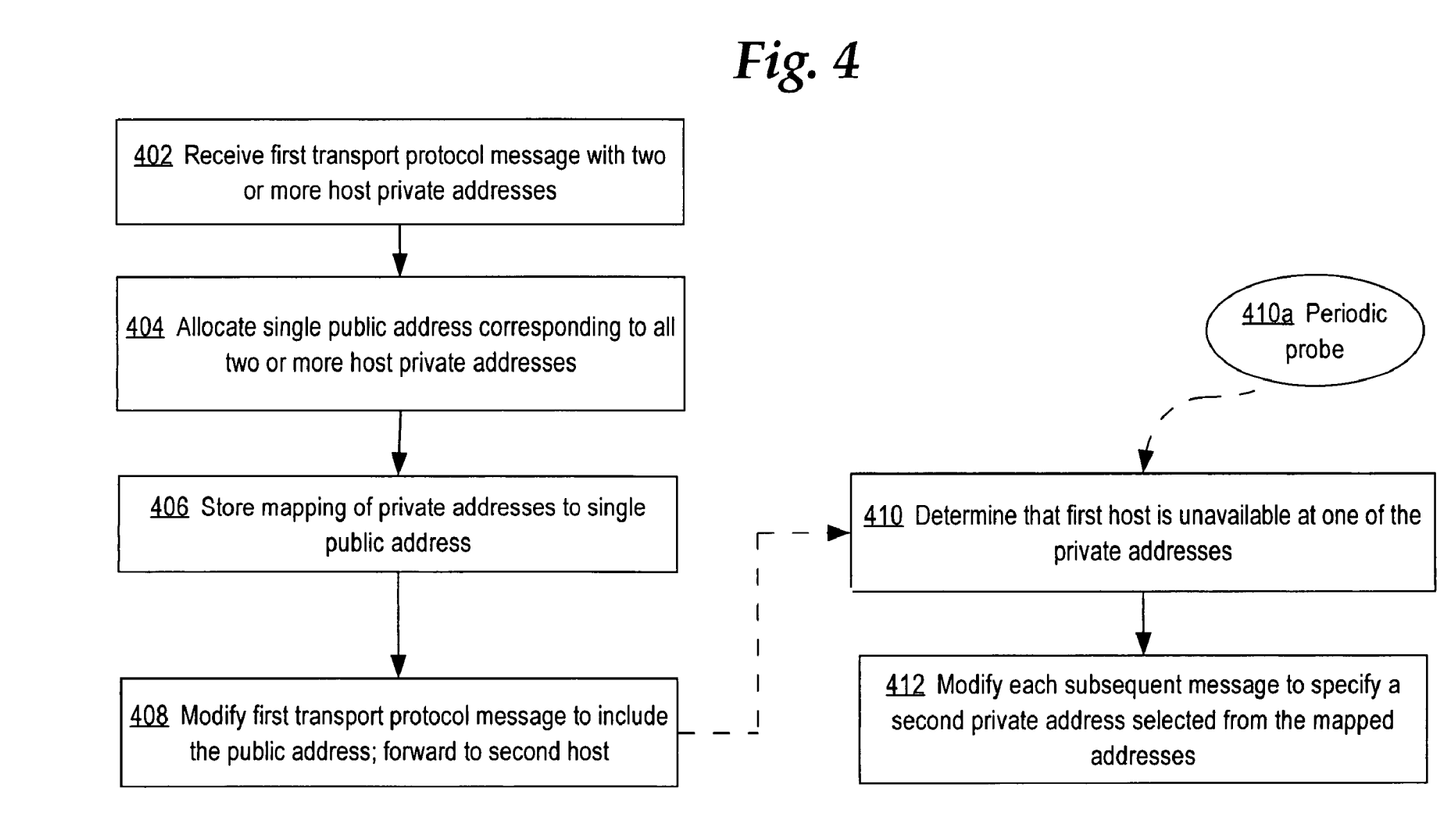
FIG. 4 is a flow diagram that illustrates a high level overview of one embodiment of a method for detecting and recovering from faults associated with transport protocol connections across network address translators.

2.3 Responding to Host Address Change When NAT Can Allocate Single Public Address FIG. 4 is a flow diagram that illustrates a high level overview of one embodiment of a method for detecting and recovering from faults associated with transport protocol connections across network address translators. The solution of FIG. 4 may be used, for example, when NAT 108 cannot perform 1:1 dynamic allocation and association for multi-homed addresses, or has a small pool of public IP addresses such that local policy dictates allocating only one public IP address per host.

At step 402, a first transport protocol message with two or more host private addresses is received. In an SCTP implementation, the first message may comprise a connection INIT message that advertises two or more multi-homed IP addresses.

At step 404, a single public address corresponding to all of the two or more private addresses is allocated. For example, NAT 108 allocates one public address for the first host 100. At step 406, a mapping of private addresses to the single public address is created in a table, such as that of FIG. 3. The mapping of step 406 could be identical to that shown in FIG. 3, except that the same public IP address would be used in both entries.

At step 408, the first message is modified to include only the public address, and forwarded to the second host that is indicated as the destination for the message. For example, assume that the mapping of step 406 is that of FIG. 3 except that the public IP address in both entries is 171.1.1.1. In step 408 the source IP address of the first message is changed to only 171.1.1.1. In an SCTP embodiment, step 408 involves modifying the INIT chunk to present only the single public IP address. As a result, the second host is not aware that the first host is multi-homed, and the second host will always use only the single public IP address for communications back to the first host.

At step 410, a determination is made that the first host is unavailable at any one of the private addresses. As shown by step 410*a*, step 410 can involve NAT 108 sending a periodic probe message to each interface of first host 100 to determine if that interface is operating properly. The particular kind of probe is not critical to the invention, and any form of link failure detection mechanism or interface failure detection mechanism can be used. In one embodiment, NAT 108 periodically sends an ICMP ping packet to each interface of the first host 100, and the determination of step 410 is made if a specified timeout interval passes without receiving a reply from the pinged interface.

At step 412, each subsequent message is modified to specify a second private address that is selected from the mapped addresses. For example, assume that the determination of step 410 indicates that an interface of first host 100 associated with private IP address 10.1.1.1 is non-responsive. At step 412, each message processed at the NAT after the determination of step 410, and directed from the second host to the first host, is modified at the NAT to substitute the second private address 20.1.1.1 from table 302 of FIG. 3.

Using this approach, messages from the second host 102 will reach the first host 100 even when the second host is unaware that a target interface of the first host has failed. Further, the first host and second host need not re-negotiate parameters for a new session or connection on the second interface. Moreover, the approach herein is compatible with all applications on the first host or second host that are running on top of the transport layer.

Certain embodiments presented herein provide multiple solutions to seamlessly switch over to a different four-tuple of an SCTP multi-homed end host in a network that uses a NAT device or PAT device. A session can progress seamlessly in the event that a multi-homed endpoint becomes unreachable.

Embodiments of these approaches can be used in any NAT device, such as a router configured with network address translation software.

3.0 Implementation Mechanisms—Hardware Overview

Figure 5:
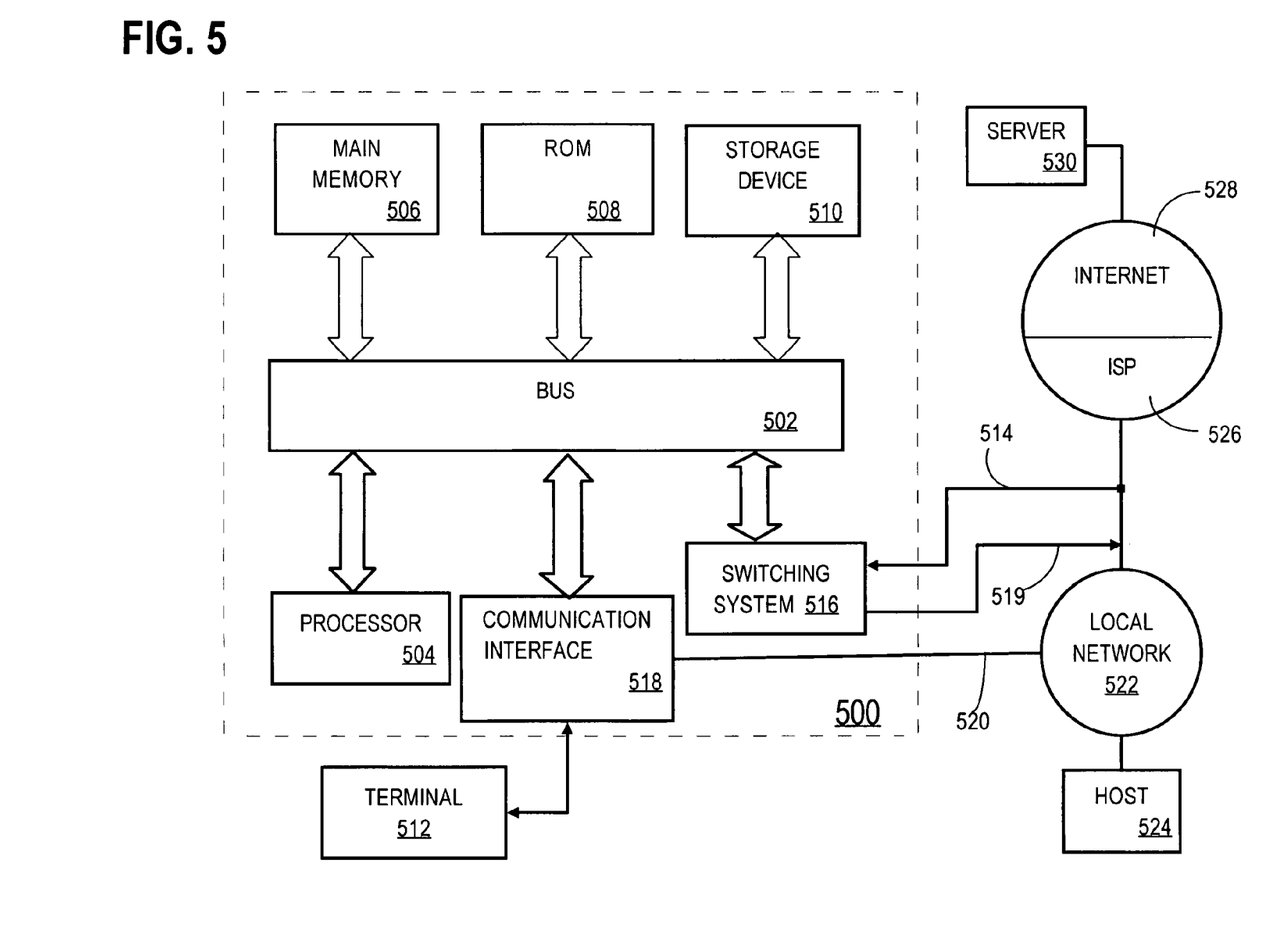
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for detecting and recovering from faults associated with transport protocol connections across network address translators. According to one embodiment of the invention, detecting and recovering from faults associated with transport protocol connections across network address translators are provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for detecting and recovering from faults associated with transport protocol connections across network address translators as described herein.

Processor 504 may execute the received code as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of detecting and recovering from faults associated with transport protocol connections across network address translators, the method comprising the computer-implemented steps of:

receiving a connection initialization message of a transport protocol, wherein the connection initialization message includes two or more private network addresses of a first host;

allocating two or more public network addresses corresponding to the two or more private network addresses;
electronically creating and storing a first mapping of a first private network address to a first public network address, a second mapping of a second private network address to a second public network address, and a pointer from the first mapping to the second mapping;
in response to receiving a second message of the transport protocol from the first host, creating and storing context information comprising one or more session parameters for a first transport session between the first host and a second host referencing the first private network address, and creating a second pointer from the first mapping and the second mapping to the context information;
receiving a third message of the transport protocol from the second host that specifies the second public network address as a destination;
based on the mappings and the pointers, automatically using the session parameters of the context information for processing subsequent messages between the first host and the second host that use the second public network address and the second private network address.

2. A method as recited in claim 1, wherein the transport protocol is Stream Control Transmission Protocol (SCTP).

3. A method as recited in claim 1, wherein the public network addresses are allocated from an available address pool of a network address translator (NAT).

4. A method as recited in claim 1, wherein the first host is a multi-homed device and the second host is a server.

5. A method as recited in claim 1, wherein the first mapping and the second mapping each comprise entries in a table, wherein each entry includes a protocol identifier, a private IP address value, a private port value, a public IP address value, a public port value, a destination IP address value, and a destination port value.

6. A method as recited in claim 1, wherein the transport protocol is Stream Control Transmission Protocol (SCTP), and wherein the context information comprises a transmission sequence number (TSN) and a selective acknowledgement (SACK) chunk.

7. A method as recited in claim 1, wherein the first private network address and the second private network address are local area network Internet Protocol (IP) addresses that are not routable in the Internet, and wherein the first public network address and the second public network address are public IP addresses that are routable in the Internet.

8. A method as recited in claim 1, wherein the third message is a server response, wherein the third message includes the second public network address as a destination address, wherein the server generates the third message in response to determining that the first host is unavailable at the first public network address.

9. A method, the method comprising the computer-implemented steps of:
receiving a first message of a transport protocol, wherein the first message includes two or more private network addresses of a first host;
creating and storing a first mapping of a first private network address to a first public network address, a second mapping of a second private network address to a second public network address;
linking the first mapping to the second mapping using pointers;
in response to receiving a second message from the first host, creating and storing context information for a first transport session between the first host and a second host referencing the first private network address, and linking the context information with the first mapping and the second mapping using pointers;
receiving a third message of the transport protocol from the second host that specifies the second public network address;
based on the mappings and the pointers, automatically using the context information for processing subsequent messages between the first host and the second host that use the second public network address and the second private network address.

10. An apparatus for detecting and recovering from faults associated with transport protocol connections across network address translators, comprising:
means for receiving a connection initialization message of a transport protocol, wherein the connection initialization message includes two or more private network addresses of a first host;
means for allocating two or more public network addresses corresponding to the two or more private network addresses;
means for electronically creating and storing a first mapping of a first private network address to a first public network address, a second mapping of a second private network address to a second public network address, and a pointer from the first mapping to the second mapping;
means for creating and storing, in response to receiving a second message of the transport protocol from the first host, context information comprising one or more session parameters for a first transport session between the first host and a second host referencing the first private network address, and creating a second pointer from the first mapping and the second mapping to context information;
means for receiving a third message of the transport protocol from the second host that specifies the second public network address as a destination;
means for automatically using, based on the mappings and the pointers, the session parameters of the context information for processing subsequent messages between the first host and the second host that use the second public network address and the second private network address.

11. An apparatus as recited in claim 10, wherein the transport protocol is Stream Control Transmission Protocol (SCTP).

12. An apparatus as recited in claim 10, wherein the public network addresses are allocated from an available address pool of a network address translator (NAT).

13. An apparatus as recited in claim 10, wherein the first host is a multi-homed device and the second host is a server.

14. An apparatus as recited in claim 10, wherein the first mapping and the second mapping each comprise entries in a table, wherein each entry includes a protocol identifier, a private IP address value, a private port value, a public IP address value, a public port value, a destination IP address value, and a destination port value.

15. An apparatus as recited in claim 10, wherein the transport protocol is Stream Control Transmission Protocol (SCTP), and wherein the context information comprises a transmission sequence number (TSN) and a selective acknowledgement (SACK) chunk.

16. An apparatus as recited in claim 10, wherein the first private network address and the second private network address are local area network Internet Protocol (IP) addresses that are not routable in the Internet, and wherein the first public network address and the second public network address are public IP addresses that are routable in the Internet.

17. An apparatus as recited in claim 10, wherein the third message is a server response, wherein the third message includes the second public network address as a destination address, wherein the server generates the third message in response to determining that the first host is unavailable at the first public network address.

18. An apparatus for detecting and recovering from faults associated with transport protocol connections across network address translators, comprising:
   a network interface that is coupled to the data network for receiving one or more packet flows therefrom;
   a processor;
   one or more stored sequences of instructions which, when executed by the processor, cause the processor to carry out the steps of:
      receiving a connection initialization message of a transport protocol, wherein the connection initialization message includes two or more private network addresses of a first host;
      allocating two or more public network addresses corresponding to the two or more private network addresses;
      electronically creating and storing a first mapping of a first private network address to a first public network address, a second mapping of a second private network address to a second public network address, and a pointer from the first mapping to the second mapping;
      in response to receiving a second message of the transport protocol from the first host, creating and storing context information comprising one or more session parameters for a first transport session between the first host and a second host referencing the first private network address, and creating a second pointer from the first mapping and the second mapping to the context information;
      receiving a third message of the transport protocol from the second host that specifies the second public network address as a destination;
      based on the mappings and links pointer, automatically using the session parameters of the context information for processing subsequent messages between the first host and the second host that use the second public network address and the second private network address.

19. An apparatus as recited in claim 18, wherein the transport protocol is Stream Control Transmission Protocol (SCTP).

20. An apparatus as recited in claim 18, wherein the public network addresses are allocated from an available address pool of a network address translator (NAT).

21. An apparatus as recited in claim 18, wherein the first host is a multi-homed device and the second host is a server.

22. An apparatus as recited in claim 18, wherein the first mapping and the second mapping each comprise entries in a table, wherein each entry includes a protocol identifier, a private IP address value, a private port value, a public IP address value, a public port value, a destination IP address value, and a destination port value.

23. An apparatus as recited in claim 18, wherein the transport protocol is Stream Control Transmission Protocol (SCTP), and wherein the context information comprises a transmission sequence number (TSN) and a selective acknowledgement (SACK) chunk.

24. An apparatus as recited in claim 18, wherein the first private network address and the second private network address are local area network Internet Protocol (IP) addresses that are not routable in the Internet, and wherein the first public network address and the second public network address are public IP addresses that are routable in the Internet.

25. An apparatus as recited in claim 18, wherein the third message is a server response, wherein the third message includes the second public network address as a destination address, wherein the server generates the third message in response to determining that the first host is unavailable at the first public network address.

* * * * *

UNITED STATES PATENT AND TRADEMARK OFFICE
CERTIFICATE OF CORRECTION

PATENT NO. : 7,388,829 B2  
APPLICATION NO. : 11/089721  
DATED : June 17, 2008  
INVENTOR(S) : Senthil Sivakumar et al.

Page 1 of 1

It is certified that error appears in the above-identified patent and that said Letters Patent is hereby corrected as shown below:

In the claims:

Column 14, Claim 18, Line 1: Delete "links pointer" and insert --the pointers--

Signed and Sealed this

Twenty-sixth Day of May, 2009

JOHN DOLL  
*Acting Director of the United States Patent and Trademark Office*